United States Patent [19]

Ono et al.

[11] Patent Number: 5,224,904
[45] Date of Patent: Jul. 6, 1993

[54] CHAIN JOINT

[75] Inventors: Takuma Ono, Enuma; Akiyoshi Komeya, Kaga, both of Japan

[73] Assignee: Daido Kogyo Co., Ltd., Ishikawa, Japan

[21] Appl. No.: 884,005

[22] Filed: May 18, 1992

[30] Foreign Application Priority Data

May 17, 1991 [JP] Japan .................. 3-44739[U]

[51] Int. Cl.⁵ .............................. F16G 13/02
[52] U.S. Cl. .................. 474/220; 474/225; 474/231
[58] Field of Search ........ 474/206, 212, 213, 218-220, 474/223-225, 231

[56] References Cited

U.S. PATENT DOCUMENTS

| 1,728,445 | 9/1929 | Renold et al. | 474/231 |
| 1,945,357 | 1/1934 | Pierce | 474/231 X |
| 2,049,841 | 8/1936 | Kjaer | 474/231 X |
| 2,155,584 | 4/1939 | Bryant et al. | 474/231 |
| 2,234,449 | 3/1941 | Pray | 474/224 X |
| 2,431,702 | 12/1947 | McCann | 474/231 |
| 2,431,764 | 12/1947 | McCann | 474/231 |
| 2,755,677 | 7/1956 | Bremer | 474/219 X |
| 2,939,747 | 6/1960 | Tucker | 474/231 X |
| 3,811,334 | 5/1974 | Kuenzig et al. | 474/231 |
| 4,129,045 | 12/1978 | Kishitani | 474/231 |

Primary Examiner—Ramon S. Britts
Assistant Examiner—Roger J. Schoeppel
Attorney, Agent, or Firm—Wenderoth, Lind & Ponack

[57] ABSTRACT

A chain joint for a power transmission chain comprises a joint pin and a projecting bush having brims swelling outwardly both its ends with at least one a slit extending longitudinally through the bush. The projecting bush is inserted into a pin hole and a bush hole of the chain, and the joint pin is pressed in an inner hole of the projecting bush. Then, the projecting bush is spread outwardly due to the slit and fits in the pin hole perfectly. Furthermore, the brims engage with the outer link plates on their outsides to prevent the projecting bush from coming off.

11 Claims, 3 Drawing Sheets

FIG. 3a
FIG. 3b
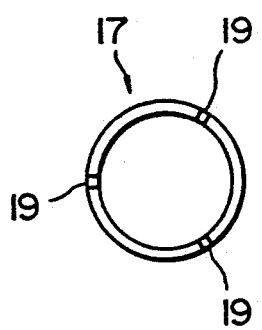
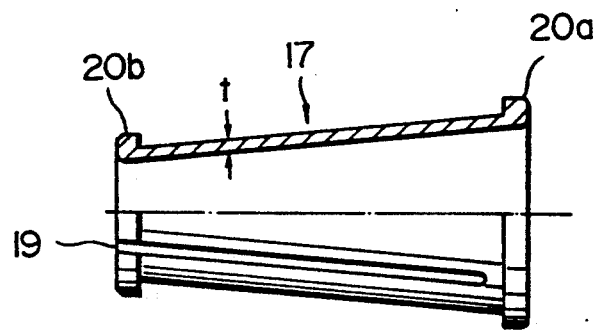
FIG. 4a
FIG. 4b
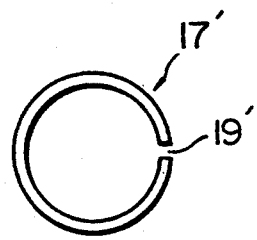
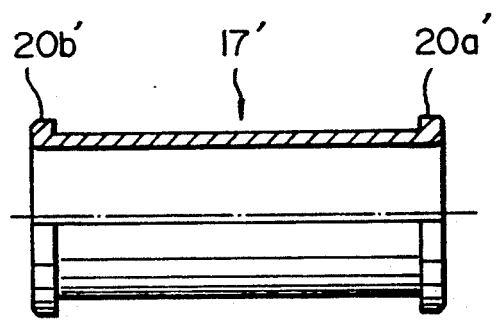

CHAIN JOINT

BACKGROUND OF THE INVENTION

1. Field of the Invention

This invention relates to a power transmission chain used in vehicles such as a bicycle and a motorcycle and industrial machines, and more particularly, to a chain joint for connecting or disconnecting the power transmission chain.

2. Description of the Prior Art

A bicycle chain, as well as a motorcycle chain, is an endless chain which alternately joins a plurality of outer links and a plurality of inner links with a pin fitted into a bush and caulked at both its ends. If the chain is elongated during use and prone to be off of a sprocket, it has to be disconnected and then connected again after removing some links. In order to disconnect the chain, it is necessary to forcibly pull out the caulked pin using a jig. When re-connecting the chain, on the other hand, the pin which was pulled out must be inserted into pin holes before the being caulked again.

When removing a pin which is firmly caulked by force, however, the pin will be shaved where it is caulked, and the pin holes will be out of shape in part. This may reduce the caulking force which is applied in re-connecting, and may cause the chain to eventually be broken during running because it comes off.

A conventional chain joint is not suitable for repeatedly connecting and disconnecting the chain, and it is troublesome to pull the pin out by force and then to caulk the pin every lime the chain is disconnected and connected again.

On the other hand, a chain for an industrial machine is linked end to end by a joint forming a piece of the chain after it is set onto the sprockets. As shown in FIG. 6, the joint has a long pin 1 and a clip 3. The clip 3 is made of a steel spring and fitted in a circular groove 1a formed where the pin 1 comes out the pin hole 2 to prevent the pin 1 from coming off.

The joint construction as described above suggests, however, that the chain has to be greater in width W, and the clip 3 may be broken due to metallic fatigue.

SUMMARY OF THE INVENTION

It is therefore an object of the present invention to solve the problems noted above and to provide a chain joint for a power transmission chain which can easily disconnect and connect the chain as necessary without reducing jointing strength.

A feature of a chain joint according to the present invention is that it is provided with a joint pin and a projecting bush having brims which project outwardly on both ends of the bush, and are permitted to expand radially with a structure such as a slit.

The chain joint according to the present invention makes the projecting bush be inserted into pin holes and a bush hole and the joint pin into an inner hole of the projecting bush. The projecting bush thereby spreads outwardly to fit in the pin holes, and the brims of the bush engage with outer link plates outside to prevent the projecting bush from coming off.

BRIEF DESCRIPTION OF THE DRAWINGS

FIG. 3a is an elevation of a projecting bush used in the present invention.

FIG. 3b shows the projecting bush shown in FIG. 3a, and is a side view sectioned upward from the center line.

FIG. 4a is an elevation of another embodiment of a projecting bush.

FIG. 4b shows the projecting bush shown in FIG. 4a, and is a side view sectioned upward from the center line.

DETAILED DESCRIPTION OF THE PREFERRED EMBODIMENTS

Figure 1:
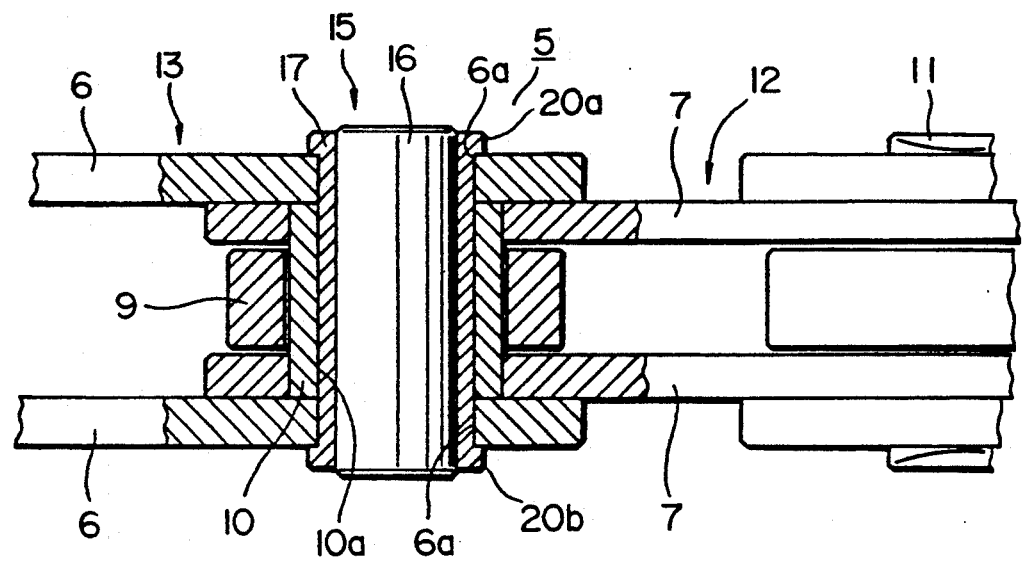
FIG. 1 shows a chain joint according to the present invention, and is a partially sectioned plan view showing a state where a chain is connected.

FIG. 1 shows a joint part of a chain 5 according to the present invention. The chain 5 is a roller chain and is basically composed of right and left outer link plates 6, right and left inner link plates 7, a roller 9, a bush 10, and a pin 11. The chain 5 has an inner link 12 wherein the right and left inner link plates 7, are coupled by means of bushes with each other at their front and rear end portions, and wherein the roller 9 is fitted rotatably onto the bush 10.

The chain 5 also has an outer link 13 wherein the right and left outer link plates 6 are coupled with each other at their front and rear end portions by means of pins 11 fitted into bushes 10 to join the inner link 12 with the outer link 13 alternately as well as flexibly, caulking the pins 11 on both their ends. A joint 15 according to the present invention links the chain 5 end to end to be an endless chain.

The joint 15 is different from the other parts of the chain, namely it has a thinner joint pin 16 than the piris 11 used in the other parts, and a projecting bush 17. The projecting bush 17 as shown in FIGS. 3a and 3b is a tapered cylinder wherein three slits 19 are formed starting at the smaller diameter end and extending toward the larger diameter of the bush. Circular brims 20a and 20b project outwardly on the smaller and larger diameter ends. Since the slits 19 extend near the end of the larger diameter but do not go through it, the brim 20a on the larger diameter remains perfectly circular without any notches. The projecting bush 17 is such that the inner diameter on the larger diameter side is almost the same as the outer diameter of the pin 16, while the outer diameter is almost the same as the pin hole 6a of the outer link plate 6. In addition, the bush 17 is almost the same in thickness at every part thereof.

Figure 2:
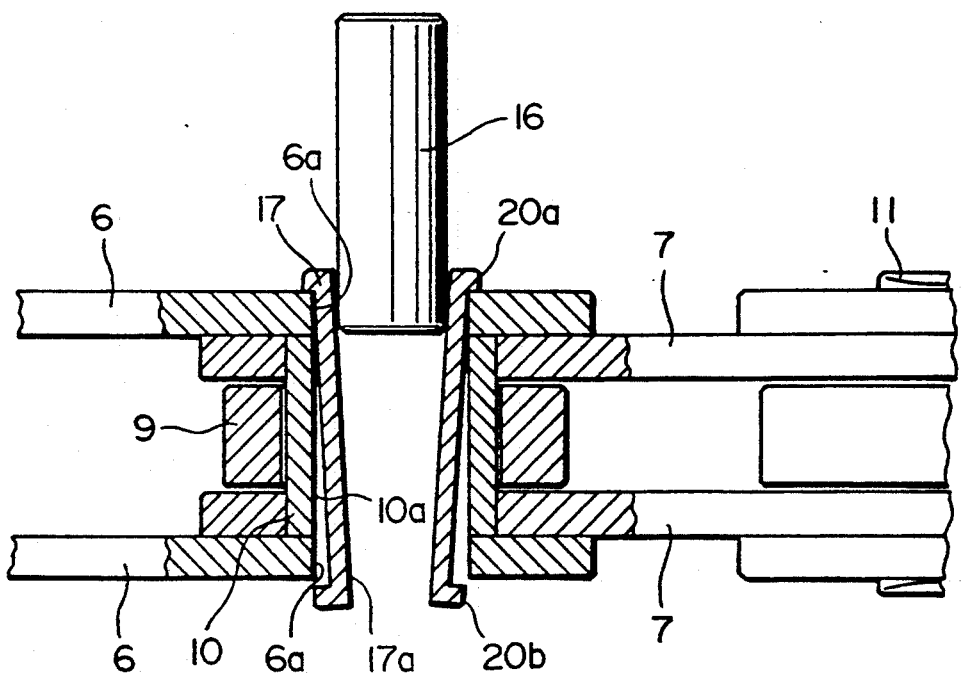
FIG. 2 shows the chain joint shown in FIG. 1, and is a partially sectioned plan view showing the process of connecting the chain.

In order to connect the chain 5 using the joint 15, the projecting bush 17 is inserted into the pin holes 6a of the outer link plates 6 and a hole 10a of the bush 10 of the inner link 12 until the brim 20a on the larger diameter side touches one of the outer link plates 6 on the outside thereof, and the brim 20b on the smaller diameter side projects from the pin hole 6a of the other link plates as shown in FIG. 2. This is possible because the projecting bush 17 is tapered, and the slits 19 enable the bush 17 to contract in diameter for easier insertion into the bush hole 10a, even with the brim 20b formed at the end of the smaller diameter side of the bush. The joint pin 16 is thereafter pressed into an inner hole 17a of the projecting bush 17, which readily accepts the joint pin 16 as the slits 19 spread, and fits in the pin holes 6a of the outer link plates 6, because the projecting bush itself expands. This brims 20a 20b engage with the outer link plates 6 on the outside thereof to be stoppers (see FIG. 1).

The joint pin 16 as pressed in the projecting bush 17 can fill the inner hole 17a overall, so it is prevented from coming off.

Accordingly, the joint 15 connects the inner link 12 with the outer link 13 to make the chain 5 endless, and maintains the flexibility of the inner link 12 and the outer link 13, because there is a slight space between the outside of the projecting bush 17 and the inside of the bush 10. The projecting bush 17 does not come off because the brims 20a 20b engage with the outer link plates 6 on the outside thereof, and the joint pin 16 does not come off either, because it is fully pressed in and fills the inner hole 17a. As a result, it doesn't happen that the chain 5 is disconnected during running.

In order to disconnect the chain 5 using the joint 15, the joint pin 16 is pulled out with a jig and removed from the bush inner hole 17a of the projecting bush 17. Since the joint pin 6 is wholly in contact with the bush inner hole 17a, and the brims 20a and 20b engage the outer link plates 6, it is relatively easy to remove the pin 16 without deforming and abrading the projecting bush 17 and the pin 16 itself. The projecting bush 17 is contracted by the slit 19 and removed from the pin hole 6a and the bush hole 10a, and the chain is thereby disconnected.

FIGS. 4a and 4b show another embodiment of a projecting bush 17'. The projecting bush 17' is a cylindrical roll made of a single steel sheet. The projecting bush 17' has a slit 19' extending through it and brims 20a' and 20b' on both ends.

Like the earlier embodiment, the projecting bush 17' can be contracted in diameter due to the slit 19' and is inserted into the pin holes 6a and the bush hole 10a. With the pin 16' pressed in the hole of the bush 17', the projecting bush 17' is expanded outwardly due to the slit 19' to engage the brims 20a' and 20b' with the outer link plates 6 on the outside thereof.

Figure 5:
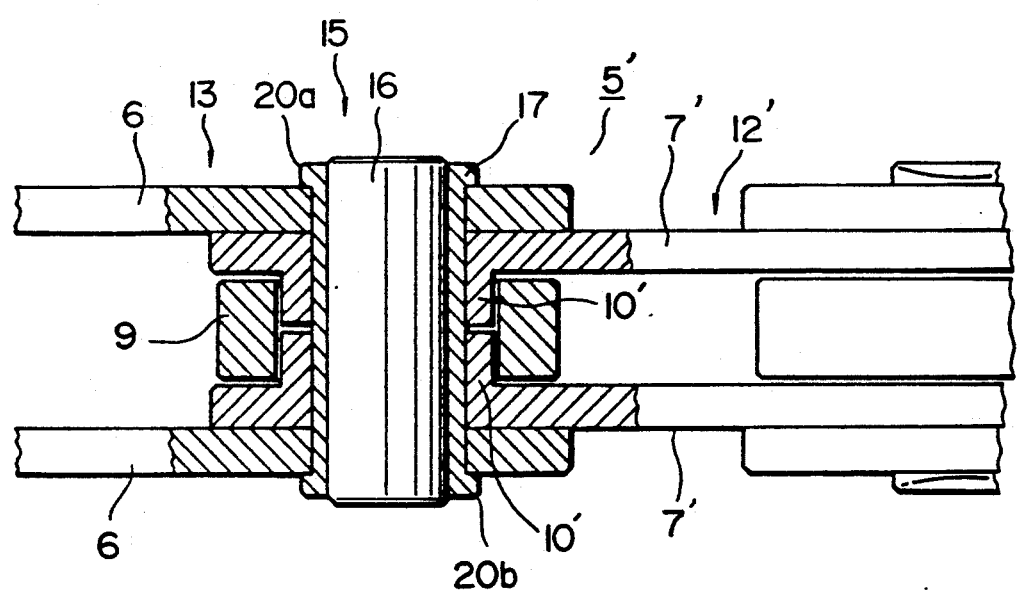
FIG. 5 is a partially sectioned plan view showing another embodiment of a chain joint according to the present invention.
Figure 6:
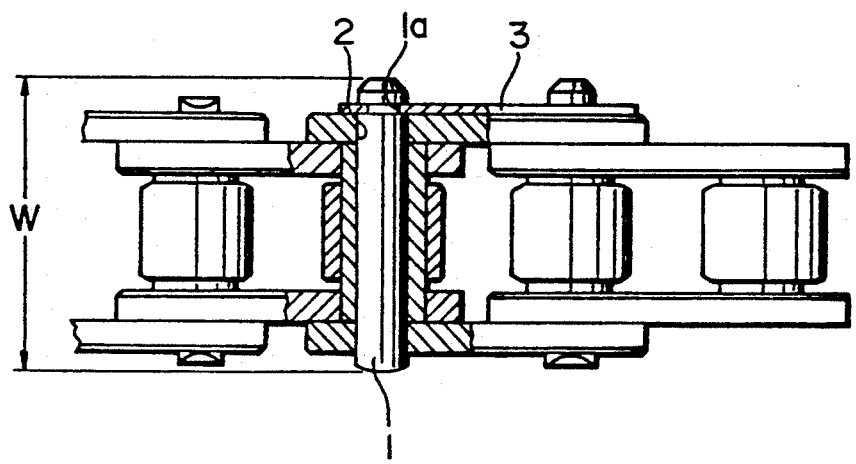
FIG. 6 is a partially sectioned plan view showing a conventional chain joint using a clip.

FIG. 5 shows an embodiment of the joint 15 according to the present invention for use with another chain 5'. The chain 5' is similar to the earlier embodiment as to the outer link 13' but partially different in an inner link 12'. A circular bush part 10' projecting sideways at the front and rear end portions, respectively, of the inner plates 7' is integrally formed. The bush parts 10' of the inner plates 7' are situated face to face to form a bush on the plates 7', and are situated face to face to form a bush on which the roller 9 is rotatably supported. The inner link 12' is caught by the outer link 13 to prevent it from splitting, and thus composes a series of chain 5'. The joint 15 according to FIG. 5 is used in the chain 5' in the same way as the previous embodiment, the pin 16 being pressed in the inner hole 17a of the projecting bush 17 and the brims 20a and 20b engage with the outer link plates 6 on their outsides to connect the chain 5'.

The projecting bush need not be restricted to those mentioned above. It is possible to use any bushes, such as a split bush and an elastic bush, which are swelled outwardly by the pin 16.

TECHNICAL ADVANTAGES OF THE INVENTION

According to the present invention as seen above, the projecting bushes 17 and 17' which can expand or contract diametrically are inserted into the pin hole 6a and bush hole 10a, and the joint pin 16 is pressed in the inner hole 17a of the projecting bush so that the chain can be connected with ease. When the chain is in connection, the projecting bushes 17 and 17' engage the brims 20a and 20b, 20a' and 20b' with the respective outer link plates 6 on the outsides thereof to prevent the bushes from coming off. The pin 16 is, on the other hand, pressed in and fills the inner holes 17a of the projecting bushes 17 and 17', which thus does not permit them to come off. This assures the joint to remain connected while the chain is in operation.

When the pin 16 is removed from the inner hole 17a of the projecting bushes 17 and 17' to disconnect the chain, the projecting bushes contract and are readily displaced from the pin hole 6a and the bush hole 10a. It is possible thereby to readily remove the joint 15 and disconnect the chain readily. It does not occur, then, that the projecting bushes 17 and 17' and the joint pin 16 are damaged, or that the pin hole 6a is abraded. This is why it is well assured that the joint 15 neither loosens nor gets out of place even if the chain is disconnected and connected repeatedly.

The joint 15 is simple in construction, for it is composed only of the projecting bushes 17 and 17' and the pin 16, which makes it possible to arrange it within almost the same space as other parts of the chain. This is because the chain does not interfere with any other member.

What is claimed is:

1. A chain joint in a chain having a plurality of outer and inner links, each said outer link having a pair of outer link plates and each said inner link having a pair of inner link plates, wherein said inner links are connected to said outer links by a bush of each said inner link, said bush having a bush hole therethrough, and a pin inserted through pin holes in said outer link plates and through said bush hole, said chain joint comprising:
    a diametrically expandable and contractible projecting bush having an inner hole and brims projecting outwardly from opposite ends thereof, said projecting bush being disposed to extend through a said bush hole of a said bush of a said inner link and through said pinholes of corresponding respective said outer link plates of a said outer link; and
    a joint pin fitted into said inner hole of said projecting bush such that said projecting bush is in an expanded state and said brims engage respective said outer link plates of the said outer link on the outsides thereof.

2. The chain joint of claim 1, wherein said projecting bush is expandable and contractible due to a slit in said projecting bush that extends longitudinally thereof.

3. The chain joint of claim 1, wherein said projecting bush tapers towards one end in an unexpanded state and has a plurality of slits extending from the smaller diameter end thereof toward the larger diameter end for expansion into the expanded state.

4. The chain joint of claim 1, wherein said projecting bush is a cylindrical roll of steel sheet having a single slit extending therethrough from one end to the other.

5. The chain joint of claim 1, wherein said bush of each said inner link is a single cylindrical member extending between said inner link plates, said bush having a roller thereon.

6. The chain joint of claim 1, wherein said bush of each said inner link is formed by a cylindrical projection projecting integrally from each said inner link plate toward the other said link plate of each said inner link, said bush having a roller thereon.

7. A chain joint, comprising:
   a pair of outer link plates having pinholes in the ends thereof;
   a pair of inner link plates having ends disposed between the ends of said outer links, said pair of inner link plates having a bush with a bush hole therethrough connecting said inner link plates, said bush hole being aligned with said pinholes in the ends of said outer link plates;
   a diametrically expandable and contractible projecting bush having flanges at opposite ends thereof and a through hole extending therethrough, said projecting bush being disposed so as to project through said bush hole of said bush and through said pinholes of said outer link plates; and
   a joint pin fitted into said through hole of said projecting bush such that said projecting bush is in an expanded state and said flanges engage respective said outer link plates on the outsides thereof.

8. The chain joint of claim 7, wherein said projecting bush has a slit therein extending from one end thereof toward the other end.

9. The chain joint of claim 7, wherein a plurality of slits extend in said projecting bush from one end thereof toward the other.

10. The chain joint of claim 9, wherein said projecting bush tapers toward the one end in an unexpanded state.

11. The chain joint of claim 7, wherein said projecting bush is a cylindrical roll of steel sheet having a single slit extending therethrough from one end to the other.

* * * * *